Figure 1:
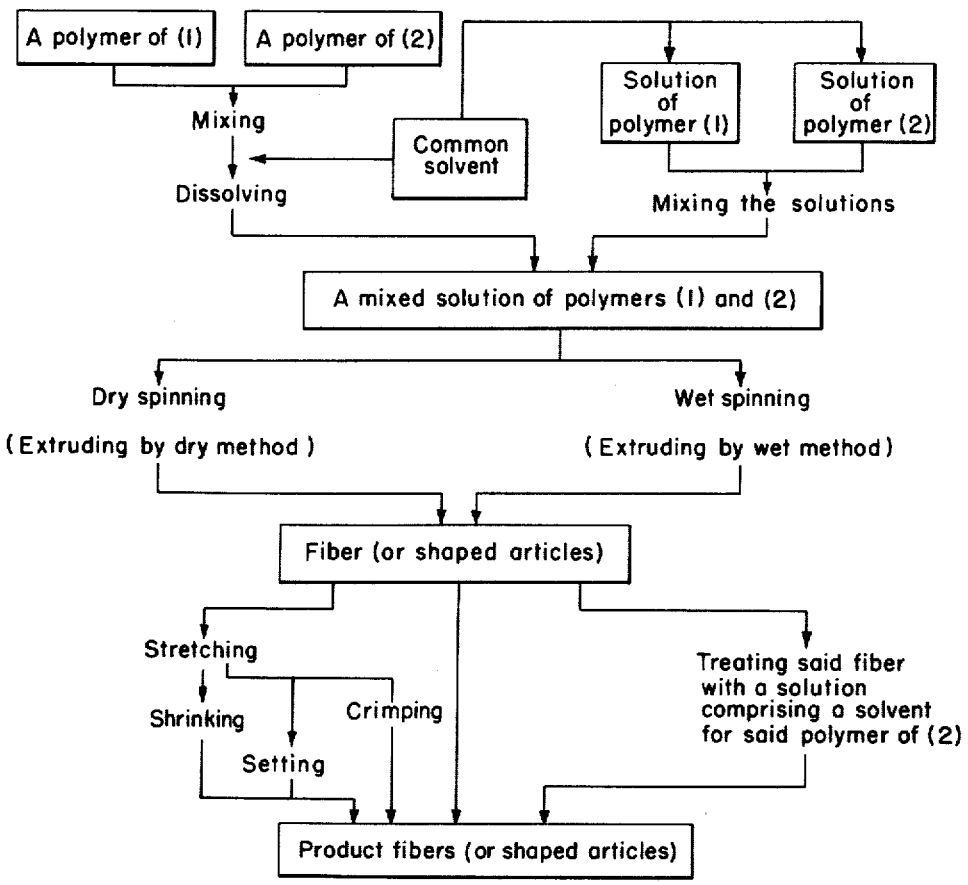

(1) A vinyl chloride polymer
(2) A vinyl cyclic polymer

United States Patent Office 3,110,548
Patented Nov. 12, 1963

3,110,548
SHAPED ARTICLES OF MIXED POLYMERS AND METHOD OF MANUFACTURING THEM
Osamu Fukushima, Yutaka Sakurada, and Kanji Matsubayashi, Kurashiki City, Japan, assignors to Kurashiki Rayon Co., Ltd., Kurashiki City, Japan, a corporation of Japan
Filed Nov. 21, 1961, Ser. No. 154,072
Claims priority, application Japan Nov. 30, 1960
10 Claims. (Cl. 18—54)

The present invention relates to a method of manufacturing synthetic fibres, films and other shaped articles of mixed polymers having excellent physical properties.

The principal object of the invention is to provide the synthetic fibres, films and other shaped articles of mixed polymers having excellent hot-water resistance, heat resistance and elasticity which have never been attained by the heretofore known fibres made of polyvinyl chloride alone.

The invention is generally well adapted for the production of fibres, films and other shaped articles, but the following description is mainly referred to the fibres.

Up to the present, there have been industrially produced many synthetic fibres such as those made of polyvinyl alcohol, polyamide or polyacrylic series, but the high molecular weight raw materials of such synthetic fibres are almost all of crystalline high polymers so that after they are made as fibers there exist naturally the crystalline part and non-crystalline part, and it is apparent that the excellent physical properties of the fiber can be exhibited by the mutual function of these parts, and these synthetic fibres show the most excellent physical properties as fibres by manufacturing them from a single high molecular weight material, and if at least 10% of various high molecular or low molecular weight substances are mixed the physical properties of the fibres thus obtained are lower than those of the fibres made by single substance except the improvement in dyeability and hygroscopic property as is apparent from various facts.

The invention is to provide a method of manufacturing synthetic fibres of polyvinyl chloride having excellent hot-water resistance and heat resistance having essentially different structures from those of known synthetic fibres as above described. Thus, according to the invention polyvinyl chloride or a copolymer consisting mainly of polyvinyl chloride (A-polymer), and a polymer of vinyl cyclic compounds or a copolymer consisting mainly of such polymers (B-polymer) which have heretofore been considered as impossible to exhibit sufficient properties by alone, and which have higher second order transition temperature than 100° C., higher softening temperature than 150° C., and hydrophobic property, such as, poly-α-methylstyrene, are mixed together (at the condition that at least 10% of the one polymer is contained to the other polymer) and dissolved in a common solvent to provide a mixed spinning solution, from which fibres are manufactured either by dry or wet process. The mixed fibres thus produced by the method of the invention have considerably improved heat resistance, hot-water resistance and elasticity if compared with the synthetic fibres of vinyl chloride which had already been industrially produced.

In general, when two different high molecular weight substances are mixed and dissolved, and the mixed solution is left for a certain time after it has been prepared, there occurs very often demixing phenomena such as separating into two high molecular substances owing to the difference in solubilities into the solvent. But according to the invention it has been found that if the degree of polymerization of high molecular substances, or kinds of polymers or solvents are suitably selected the demixing of a mixed spinning solution can be minimized and the apparent heterogeneity of the mixed fibres, which is assumed to be caused by the demixing, can not be absolutely recognized.

However, in order to obtain a new synthetic fibre having very excellent properties the object can not be attained by a mere fact of using a common solvent which has very good solubility for both of the two different high molecular weight substances and for which the spinnability of such mixed spinning solution is very good. On the contrary, in order to improve the hot-water resistance, heat resistance and other properties of the synthetic fibres of polyvinyl chloride the secondary substance (B-polymer) to be mixed with the polyvinyl chloride, or a copolymer consisting mainly of vinyl chloride (A-polymer) should have more basic condition, that is B-polymer to be used in the invention must essentially have the following three properties.

(1) Second order transition temperature at above 100° C.
(2) Softening temperature at above 150° C.
(3) Hydrophobic property (Second order transition temperature was measured by dilatometric technique. Softening temperature was measured by micro hot stage.)

It is the basic condition to complete this invention that B-polymer has the above three conditions. Polymers of vinyl cyclic compounds or copolymers consisting mainly of these polymers, such as poly-α-methylstyrene, polydichlorostyrene, poly-dimethylstyrene, and copolymer of styrene with acenaphthylene, etc., have completely above these basic conditions, and also have a great future in the field of raw matreials.

The most important thing of the invention is the discovery of the facts that the mixed fibre having excellent hot-water resistance and heat resistance is obtained by mixing of a polymer of vinyl cyclic compound or a copolymer consisting mainly of these polymers having the above three properties, and polyvinyl chloride or a copolymer consisting mainly of vinyl chloride.

This invention may be more fully understood from the following description in conjunction with the accompanying drawing in which FIG. 1 is a flow diagram for preparing fibers or other shaped articles from a vinyl chloride polymer and a vinyl cyclic polymer.

About the mixed fibre composed from 1 part of some high molecular weight substances having various second order transition temperature, softening temperature and the hygroscopicity and 1 part of polyvinyl chloride (the degree of polymerization 1400), hot water resistance and heat resistance were compared each other to clarify the characteristic of the invention.

TABLE 1

| High polymer substance | Second order transition temperature (° C.) | Softening temperature (° C.) | Hygroscopicity | Mixed fibre obtained [1] | |
|---|---|---|---|---|---|
| | | | | Shrinkage in 100° C. water (percent) | Heat resistance (10% shrinkage temperature (° C.) |
| Poly-α-methyl styrene. | 110–120 | 220–230 | none | 0 | 180–190 |
| Polystyrene | 85–95 | 120–130 | none | 20–25 | 120 |
| Copolymer of styrene (50%) with maleic anhydride (50%). | | 190–210 | exist | 40–50 | 190–200 |

[1] The mixed fiber was 300% stretched at 170° C.

The results of Table 1 represent distinctly that the properties of mixed fibre depend upon the properties of B-polymer especially the three properties before described about second order transition temperature, softening temperature, and hygroscopicity. As a polymer of vinyl cyclic compound or a copolymer consisting mainly of such polymers used in the invention, poly-α-methyl styrene is most suitable in consideration of its properties and its raw materials. But as other B-polymers, following polymers were used too. Hot-water resistance and heat resistance of mixed fibres composed of vinyl chloride (1 part) and such polymer (1 part) are as follows.

TABLE 2

| B-polymer | Softening temperature (° C.) | Mixed fibre obtained | |
|---|---|---|---|
| | | Shrinkage in 100° C. water (percent) | Heat resistance (10% shrinkage temperature)(° C.) |
| Poly-2,5 dichlorostyrene | 165-175 | 1.5 | 165 |
| Poly-2,5 dimethylstyrene | 160-170 | 0 | 168 |
| Poly-α-methyl-p-methyl styrene | 200-210 | 0.5 | 180 |
| Copolymer of styrene (60%) with acenaphthylene (40%) | 180-190 | 0.5 | 170 |
| Copolymer of styrene with α-methylstyrene | 175-185 | 1.0 | 160 |

These B-polymers have higher second order transition temperature than 100° C.

In addition, as means for improving the dyeability of the mixed fibres manufactured by the method of the invention there are such a method of copolymerization of polyvinyl chloride, or a copolymer mainly consisting of vinyl chloride (A-polymer), or a polymer of vinyl cyclic compounds or a copolymer mainly consisting of them (B-polymer), with a vinyl monomer containing a group having dye affinity, such as, vinyl monomer containing basic nitrogen, sulfonic group, carboxyl group, a method of mixed spinning by adding necessary amount of high molecular substance containing basic nitrogen, sulfonic group, carboxyl group as a tertiary component, and a method of using sulfonating polymer or copolymer of vinyl cyclic compound as B-polymer, and all of such methods can considerably increase the dyeability without substantially spoiling the other physical properties.

As an example, 7 parts of polyvinyl chloride (the degree of polymerization 2,500) and 3 parts of poly-α-methyl styrene (the degree of polymerization 6,000) were mixed and dissolved in tetrahydrofuran to provide a mixed spinning solution which was extruded through a spinneret of 0.3 mm. dia. into air at 150° C. The fiber thus obtained by the dry spinning was 400% heat-stretched in air at 180° C. The physical properties of the mixed fibre thus manufactured by the method of the invention are shown in Table 3.

For the sake of comparison the typical physical properties of the fibre of polyvinyl chloride heretofore known are shown.

The stretching of the mixed fibre manufactured by the method of this invention is able to use the method of stretching in various mediums such as hot air bath, molten metal bath, salt aqueous solution, or organic solvent in which B-polymer swells and A-polymer is completely insoluble, for instance mixed solvent consisting of an alcohol which is non solvent of B-polymer, and a solvent of B-polymer. The method that after the spinning from the mixed spinning solution contained the plasticizer of B-polymer or water immiscible solvent, the fibres thus obtained are stretched in hot air bath, or hot water, also is able to be used.

As the copolymer mainly consisting of vinyl chloride to be used in the method of the invention use may be made of a copolymer mainly consisting of vinyl chloride with acrylonitrile, vinyl acetate, acrylate or α, β derivatives thereof and the like copolymer.

As a polymer of vinyl cyclic compounds or a copolymer mainly consisting thereof it is fundamentally necessary that they should have the second order transition temperature higher than 100° C. the softening temperature higher than 150° C. and hydrophobic property. As a substance having such fundamental properties, there are, for instance, as a polymer of ring substituted alkyl styrene, polyvinyl toluene (poly O-methyl styrene), polydimethyl styrene (poly 2,4-dimethyl styrene, poly 2,5-dimethyl styrene etc.), poly trimethyl styrene (poly 2,4,6-trimethyl styrene, poly 2,4,5-trimethyl styrene etc.) and poly-diiso-propylstyrene, poly-tert-butyl styrene, poly 2,6-dimethyl-4-t-butyl styrene, polycyclo hexyl styrene and the like may be used.

In addition, as ring substituted halide styrene, use is made of polychlorostyrene (poly p-chlorostyrene etc.) poly bromostyrene, poly iodostyrene, poly dichlorostyrene (poly 2,5-dichlorostyrene, poly 2,4-dichlorostyrene etc.), poly trichlorostyrene and the like.

As α-substituted polystyrene and derivative thereof, poly-α-methyl styrene, poly O-chloro-α-methyl styrene, poly 2,3-dimethyl-α-methyl styrene, poly 2,5-dichloro-α-methyl styrene, poly-α-methyl-p-methyl styrene and the like may be used. The derivatives of poly oxystyrene, poly carboxyl styrene or poly alkoxystyrene may be used too.

Moreover, polyvinyl cyclopropane, polyvinyl cyclohexane, may also be used.

In addition, various kinds of copolymers consisting of two or more of the above vinyl compounds may be used.

In order to improve the dyeability to the acid dyestuffs, acid moldant dyestuffs, cation dyestuffs and basic dyestuffs, various kinds of the groups having affinity to such dyestuffs may be introduced. A vinyl monomer containing basic nitrogen or acid group, or a group convertible to basic nitrogen or acid group, such as 2-vinyl pyridine, 4-vinyl pyridine, 2-methyl-5-vinyl pyridine, aryl amine, aryl pyridinium chloride, acrolein, acrylic acid, methacrylic acid, crotonic acid, vinyl sulfonic acid, aryl sulfonic acid, styrene sulfonic acid may be copolymerized

TABLE 3

(1) Mixed fibre according to the method of the invention.
(2) Fibre of polyvinyl chloride

| Sample | Denier | Dry | | Wet | | Elastic Recovery | | Shrinkage in 100° C. water (percent) | Heat resistance (10% shrinkage temperature), ° C. |
|---|---|---|---|---|---|---|---|---|---|
| | | Tenacity | Elongation | Tenacity | Elongation | Percent (elongation 3%) | Percent (elongation 5%) | | |
| 1 | 3.5 | 2.5 | 20.0 | 2.5 | 20.0 | 95 | 85 | 1.0 | 190 |
| 2 | 3.0 | 2.8 | 25.0 | 2.8 | 25.0 | 85 | 70 | 20.0 | 130 |

From the above description it will be apparent that the mixed fibre of the A-polymer and B-polymer provides a new synthetic fibre having various specialities.

with vinyl chloride, α-methyl styrene, or others. A small quantity of a homopolymer containing basic nitrogen or acid group, such as, polymer of 2-vinyl pyridine, 2-methyl- 5-vinyl pyridine, aryl amine, acrylic acid, methacrylic acid, and styrene sulfonic acid, or a polymer, such as, polyvinyl alcohol, polyvinyl benzal and polyvinyl formal containing basic nitrogen or acid group may be used by mixing as the tertiary component.

As the solvent in the case of manufacturing a mixed fibre by the invention it is almost impossible to specify a most suitable solvent since it depends on very many conditions, such as, the degree of polymerization of polyvinyl chloride, kinds of copolymers, degree of polymerization of polyvinyl cyclic compounds, kinds of copolymers thereof, crystallinity, and the difference of the spinning processes, such as, dry method, wet method or semi-melt method, or the quality of fibres and the like. For instance, cyclic ether compounds (dioxane, tetrahydrofuran etc.), dimethyl formamide, aliphatic ketone compounds (diethyl ketone, iso-propyl ketone etc.), cyclic ketone compounds (cyclohexanone, iso-phorone etc.), halogenized hydrocarbons (ethylene chloride, methylene chloride, trichloro ethylene, chloroform etc.) and a mixed solvent of these with benzene or methanol may be used.

The invention will be explained with examples in the following:

Example 1

6 parts of polyvinyl chloride (the degree of polymerization 2,000) and 4 parts of poly-α-methyl styrene (the degree of polymerization 6,000) were mixed and dissolved in tetrahydrofuran by stirring at 95° C. for 3 hours until the total polymer concentration becomes 25% to obtain a mixed spinning solution.

The mixed spinning solution thus obtained, after test at 90° C. for defoaming, was extruded through a spinneret of 0.3 mm. dia. under a pressure of 2.0 kg./cm.$^2$ into air at 150° C. The fibre thus spun was wound up at a speed of 200 m./min.

The fibre thus obtained showed very satisfactory hot water resistance, heat resistance and elasticity as shown in Table 3.

Example 2

7 parts of polyvinyl chloride (the degree of polymerization 1,500) and 3 parts of poly-α-methylstyrene (the degree of polymerization 7,000) were dissolved in tetrahydrofuran to give the total polymer concentration of 25% and to provide a mixed spinning solution.

The mixed spinning solution thus obtained was extruded through a spinneret of 0.3 mm. dia. under a pressure of 2 kg./cm.$^2$ into air at 100° C. The fibre thus spun was wound up at a point of 5 m. below the spinneret with a speed of 200 m./min.

The fibre thus spun was 700% stretched in air at 180° C.

The mixed fibre thus obtained showed remarkable improvement in the hot-water resistance, heat resistance and elasticity than those of the former synthetic fibre of polyvinyl chloride.

Example 3

7 parts of polyvinyl chloride (the degree of polymerization 2,000) and 3 parts of poly-α-methyl styrene (the degree of polymerization 8,000) were mixed and dissolved in ethylene chloride at 90° C. by stirring for 3 hours to obtain a concentration of 15% and to provide a mixed spinning solution.

The spinning solution was extruded through a spinneret of 0.08 mm. dia. under a pressure of 1.5 kg./cm.$^2$ into an aqueous solution of 20% Glaubers' salt or aqueous solution of 10% dioxane at 70° C. and the fibre was wound up at a speed of 25 m./min. after passing 2 m. through the coagulating bath.

The fibres thus spun was 500% stretched in air at 160° C. and 10% shrunk. The mixed fibre thus obtained showed very good hot-water resistance, heat resistance and elasticity.

Example 4

6 parts of a copolymer (the degree of polymerization 2,500) of 95:5 of vinyl chloride and 2-vinyl pyridine and 4 parts of poly-α-methyl styrene (the degree of polymerization 4,500) were dissolved in diethyl ketone to give a concentration of 25% and to provide a mixed spinning solution.

The spinning solution thus obtained was extruded through a spinneret of 0.2 mm. dia. under a pressure of 2.5 kg./cm.$^2$ into air at 130° C. The fibre thus spun was wound up at a speed of 250 m./min. at a position 5 m. below the spinneret and heat-stretched for 300% by passing the fibre between a pair of hot rollers at 170° C.

The mixed fibre thus obtained showed excellent hot-water resistance, heat resistance and elasticity and also a very good dyeability to acid and direct dyes.

Example 5

5 parts of polyvinyl chloride (the degree of polymerization 1,500) and 3 parts of poly-α-methyl styrene (the degree of polymerization 6,000) and 1 part of polyvinyl formal (the degree of polymerization 2,000) containing basic nitrogen were mixed and dissolved in a mixed solvent consisting of 6 parts of dioxane containing 3% water and 4 parts of benzene to give a total polymer concentration of 25% and to provide a mixed spinning solution.

The mixed spinning solution thus obtained was extruded through a spinneret of 0.3 mm. dia. under a pressure of 3 kg./cm.$^2$ into air at 150° C. The fibre thus spun was wound up with a speed of 200 m./min. at a position of 4 m. underneath the spinneret.

The fibre thus spun was stretched for 400% in air at 180° C.

The mixed fibre thus obtained had very good hot-water resistance, heat resistance, elasticity and the dyeability same as those in Example 4.

Example 6

The fibre spun by the same method as that of Example 1 was 500% stretched in the mixed solvent consisting of toluene (42%) and isopropyl alcohol (58%) at 70° C., and was set at 150° C.–160° C. The mixed fibre thus obtained showed dry tenacity of 3.0 (g./d.), dry elongation of 25%, shrinkage in 100° C. water of 2%, and dry heat resistance (10% shrinkage temperature) of 190° C.

Example 7

6 parts of polyvinyl chloride (the degree of polymerization 2,000) and 4 parts of poly-α-methylstyrene (the degree of polymerization 6,000) were mixed and dissolved in a mixed solvent consisting of benzene (50 vol. percent) and acetone (50 vol. percent) until total polymer concentration becomes 25% to provide a mixed spinning solution.

After defoaming at 95° C., the mixed spinning solution thus obtained was extruded through a spinneret of 0.3 mm. dia. under a pressure of 2.0 kg./cm.$^2$ into air at 150° C. The fibre thus spun was wound up at a speed of 200 m./min. was 500% stretched in air at 170° C.

The fibre obtained indicated very satisfactory hot-water resistance, heat resistance and elasticity as shown in Table 3.

Example 8

7 parts of polyvinyl chloride (the degree of polymerization 1,500) and 3 parts of poly-2,5 dichlorostyrene (the degree of polymerization 1,000) were dissolved in tetrahydrofuran until total polymer concentration becomes 25% to provide a mixed spinning solution.

The mixed spinning solution thus obtained was extruded through a spinneret of 0.3 mm. dia. under a pressure of 2.0 kg./cm.$^2$ into air at 100° C. The fibre spun was wound up at a speed of 200 m./min. at a position of 5 m. below the spinneret, and was subjected to 700% stretching in air at 180° C.

The hot-water resistance, heat resistance, and elasticity of the fibres thus obtained were considerably superior to that of commercial synthetic fibers belonging to the polyvinyl chloride system.

*Example 9*

7 parts of polyvinyl chloride (the degree of polymerization 2,000) and 3 parts of copolymer of acenaphthylene (40%) with styrene (60%) were mixed and dissolved in ethylenechloride to give total polymer concentration of 15% and to provide a mixed spinning solution.

The mixed spinning solution thus obtained was extruded through a spinneret of 0.08 mm. dia. under a pressure of 1.5 kg./cm.$^2$ into aqueous solution of 20% sodium sulfate or aqueous solution of 10% dioxane at 70° C., and after passing through the coagulating bath of 2 m., the fibre was wound up at a speed of 25 m./min., and was subjected to 500% stretching and 10% shrinkage.

The mixed fibre thus obtained indicated good hot-water resistance and heat resistance as shown in Table 2.

*Example 10*

6 parts of copolymer consisting of vinyl chloride (95%) with 2-vinyl pyridine (5%) and 4 parts of copolymer consisting of acenaphthylene (40%) with styrene (60%) were dissolved in tetrahydrofuran to become total polymer concentration of 25%.

The mixed spinning solution was extruded through a spinneret of 0.2 mm. dia. under a pressure of 2.5 kg./cm.$^2$ into air at 130° C. The fibre thus spun was wound up at a speed of 250 m./min. at a position of 5 m. below the spinneret, and was continuously subjected to 300% stretching between two heat rollers at 170° C.

The mixed fibre thus obtained had good heat resistance, hot-water resistance and elasticity, and indicated excellent dyeability to acid and direct colour.

*Example 11*

5 parts of polyvinyl chloride (the degree of polymerization 1,500), 3 parts of poly-α-methyl-p-methyl styrene (the degree of polymerization 3,000) and 2 parts of polyvinyl formal contained basic nitrogen (the degree of polymerization 2,000) were mixed and dissolved in 3% hydrous dioxane to give polymer concentration of 25% and to provide a mixed spinning solution.

The mixed spinning solution was extruded through a spinneret of 0.3 mm. dia. under a pressure of 3 kg./cm.$^2$ into air at 150° C. The fibre thus spun was wound up at a speed of 200 m./min. at a point of 4 m. below the spinneret, and was stretched for 400% in air at 180° C.

The heat resistance, hot water resistance, elasticity and dyeability of the fibre were extremely good.

*Example 12*

7 parts of polyvinyl chloride (the degree of polymerization 1,450) and 3 parts of poly-α-methyl styrene (the degree of polymerization 7,000) were mixed and dissolved in tetrahydrofuran to become total polymer concentration of 20% and to provide a mixed spinning solution.

The mixed spinning solution was extruded through a spinneret of 0.08 mm. dia. into the coagulating bath. The fibre thus obtained was wound up at a speed of 30 m./min., and was subjected to 500% stretching in a mixed solvent consisting of toluene (42 vol. percent) and isopropyl alcohol (58 vol. percent) at 70° C. after drying. After stretching it was dried again, and was set at 150–160° C.

*Example 13*

7 parts of polyvinyl chloride (the degree of polymerization 1,700) and 3 parts of poly-α-methyl styrene (the degree of polymerization 6,000) were dissolved in a mixed solvent consisting of tetrahydrofuran (95 vol. percent) and toluene (5 vol. percent) to give total polymer concentration of 15%, and to produce a spinning solution.

The mixed spinning solution was extruded through a spinneret of 0.08 mm. dia. into water. The fibre thus spun was wound up to the first roller at a speed of 15 m./min., was 500% stretched continuously in hot water at 85° C., and was wound up again at a speed of 90 m./min. It was also set at 160° C. for 60 min. after stretching.

*Example 14*

7 parts of polyvinyl chloride (the degree of polymerization 1,100), and 3 parts of poly-α-methyl styrene (the degree of polymerization 7,000) were mixed and dissolved in tetrahydrofuran to become a concentration of 20%. The mixed spinning solution thus obtained was extruded through a spinneret of 0.08 mm. dia. The fibre thus extruded was wound up at a speed of 30 m./min., and was 550% stretched in a mixed solution consisting of toluene (42%), isopropyl alcohol (56%) and cation activator (2%) at 70° C. After stretching the fibre was crimped by dipping in aqueous solution of 25% isopropyl alcohol, wound up, dried, and setted at 160° C.

The mixed fibre of the invention thus obtained had considerably homogeneous crimp, tensile tenacity of 2.5 g./d., and elongation of 40%, and showed excellent heat resistance, hot-water resistance, and elasticity.

*Example 15*

6 parts of polyvinyl chloride (the degree of polymerization 1,400) and 4 parts of poly-α-methyl styrene (the degree of polymerization 5,000) were dissolved in tetrahydrofuran to become total polymer concentration of 15%.

The mixed solution was coagulated into aqueous solution of 10% tetrahydrofuran to produce a mixed film by the casting method of drum type or the extruding method through a slit.

The film thus obtained had good heat resistance and hot water resistance, and showed appearance and touch such as paper.

*Example 16*

7 parts of polyvinyl chloride (the degree of polymerization 1,450) and 3 parts of sulfonated product of poly-α-methyl styrene (the degree of polymerization 7,000, the degree of sulfonation 3 mole percent) were mixed and dissolved in tetrahydrofuran to provide a mixed spinning solution of 15% total polymer concentration. The mixed spinning solution thus obtained was extruded through a spinneret of 0.08 mm. dia. into aqueous solution containing 10% tetrahydrofuran. The fibre was wound up at a speed of 20 m./min., was 500% stretched in a mixed solution consisting of toluene (42%) and isopropyl alcohol (58%) at 70° C., and heat-set at 160° C. in air. The mixed fibre thus spun showed excellent dyeability and physical properties.

We claim:

1. A synthetic shaped article of mixed polymers having excellent physical properties which comprises a blend of (1) a polymer selected from the group consisting of polyvinyl chloride, a copolymer of vinyl chloride and acrylonitrile, a copolymer of vinyl chloride and vinyl acetate, a copolymer of vinyl chloride and acrylate, a copolymer of vinyl chloride and acrylate of α,β derivatives; and (2) a vinyl cyclic polymer which has a higher second order transition temperature than 100° C., a higher softening temperature than 150° C. and hydrophobic properties selected from the group consisting of a polymer of ring substituted alkyl styrene, a polymer of ring substituted halide styrene a polymer of α-methyl styrene, a sulfonated polymer of α-methyl styrene, a polymer of ring substituted alkyl α-methyl styrene, a polymer of ring substituted halide α-methyl styrene, a polymer of the derivatives of oxy styrene, a polymer of the derivatives of carboxyl styrene, a polymer of the derivatives alkoxy styrene, a polymer of vinyl cyclopropane, a polymer of vinyl cyclohexane and a copolymer thereof.

2. The article according to claim 1 in which said shaped article is a synthetic fiber consisting of a mixture of polyvinyl chloride and poly α-methyl styrene.

3. A method for manufacturing a synthetic shaped article of mixed polymers which comprises mixing and dissolving (1) a polymer selected from the group consisting of polyvinyl chloride, a copolymer of vinyl chloride and acrylonitrile, a copolymer of vinyl chloride and vinyl acetate, a copolymer of vinyl chloride and acrylate, and a copolymer of vinyl chloride and acrylate of α,β derivatives and (2) a vinyl cyclic polymer which has a higher second order transition temperature than 100° C., a higher softening temperature than 150° C. and hydrophobic properties selected from the group consisting of a polymer of ring substituted alkyl styrene, a polymer of ring substituted halide styrene a polymer of α-methyl styrene, a sulfonated polymer of α-methyl styrene, a polymer of ring substituted alkyl α-methyl styrene, a polymer of ring substituted halide α-methyl styrene, a polymer of the derivatives of oxy styrene, a polymer of the derivatives of carboxyl styrene, a polymer of the derivatives alkoxy styrene, a polymer of vinyl cyclopropane, a polymer of vinyl cyclohexane and a copolymer thereof in a common solvent for both polymers to provide a mixed spinning solution; and extruding said mixed solution through a spinneret to provide said synthetic shaped article having excellent hot water resistance and excellent heat resistance.

4. The method according to claim 3 in which said common solvent is a solvent system selected from the group consisting of dioxane, tetrahydrofuran, dimethyl formamide, diethyl ketone, iso-propyl ketone, cyclohexanone, iso-phorone, ethylene chloride, methylene chloride, trichloroethylene, chloroform, a mixture thereof with benzene and a mixture thereof with methanol.

5. The method according to claim 3 in which said mixed spinning solution consisting of 10 to 90 parts polyvinyl chloride and 90 to 10 parts poly α-methyl styrene dissolved in tetrahydrofuran is extruded through a spinneret into an aqueous solution of sodium sulfate to provide a fiber having 1.0% shrinkage in 100° C. water.

6. The method according to claim 3 in which said mixed spinning solution consisting of polyvinyl chloride and poly α-methyl styrene dissolved in ethylene chloride is extruded through a spinneret into air.

7. The method according to claim 3 in which said mixed solution is extruded through a spinneret into a coagulated bath selected from the group consisting of water and a solution mainly consisting of water.

8. The method according to claim 3 in which said common solvent consists of a mixture of water miscible and water immiscible solvent and the solution therefrom is extruded through a spinneret into a coagulated bath selected from the group consisting of water and a solution mainly consisting of water and the fiber therefrom is stretched in hot water.

9. A method for manufacturing synthetic fibers of mixed polymers having excellent physical properties which comprises mixing and dissolving (1) a polymer selected from the group consisting of polyvinyl chloride, a copolymer of vinyl chloride and acrylonitrile, a copolymer of vinyl chloride and acrylate, and a copolymer of vinyl chloride and acrylate of α,β derivatives and (2) a vinyl cyclic polymer which has a higher second order transition temperature than 100° C., a higher softening temperature than 150° C. and hydrophobic properties selected from the group consisting of a polymer of ring substituted alkyl styrene, a polymer of ring substituted halide styrene, a polymer of α-methyl styrene, a sulfonated polymer of α-methyl styrene, a polymer of ring substituted alkyl α-methyl styrene, a polymer of ring substituted halide α-methyl styrene, a polymer of the derivatives of oxy styrene, a polymer of the derivatives of carboxyl styrene, a polymer of the derivatives alkoxy styrene, a polymer of vinyl cyclopropane, a polymer of vinyl cyclohexane and a copolymer thereof in a common solvent for both polymers to provide a mixed spinning solution; extruding said spinning solution through a spinneret to provide said fibers; and treating said extruded fiber with a solution comprising a solvent for said vinyl cyclic polymer selected from the group consisting of benzene, toluene, xylene, ethylene chloride, and tetrahydrofuran and an alcohol selected from the group consisting of methyl-, ethyl-, isopropyl-alcohol and ethylene glycol.

10. A method for manufacturing crimped synthetic fibers of mixed polymers having excellent physical properties which comprises mixing and dissolving (1) a polymer selected from the group consisting of polyvinyl chloride, a copolymer of vinyl chloride and acrylonitrile, a copolymer of vinyl chloride and vinyl acetate, a copolymer of vinyl chloride and acrylate, and a copolymer of vinyl chloride and acrylate of α,β derivatives and (2) a vinyl cyclic polymer which has a higher second order transition temperature than 100° C., a higher softening temperature than 150° C. and hydrophobic properties selected from the group consisting of a polymer of ring substituted alkyl styrene, a polymer of ring substituted halide styrene, a polymer of α-methyl styrene, a sulfonated polymer of α-methyl styrene, a polymer of ring substituted alkyl α-methyl styrene, a polymer of ring substituted halide α-methyl styrene, a polymer of the derivatives of oxy styrene, a polymer of the derivatives of carboxyl styrene, a polymer of the derivatives alkoxy styrene, a polymer of vinyl cyclopropane, a polymer of vinyl cyclohexane and a copolymer thereof in a common solvent for both polymers to provide a mixed spinning solution; extruding said spinning solution through a spinneret to provide said fiber; stretching said extruded fiber in solution; and treating said stretched fiber in an alcohol solution to crimp it.

References Cited in the file of this patent
UNITED STATES PATENTS

| | | |
|---|---|---|
| 2,761,855 | Ham | Sept. 4, 1956 |
| 2,948,708 | Walles et al. | Aug. 9, 1960 |

FOREIGN PATENTS

| | | |
|---|---|---|
| 530,162 | Belgium | Aug. 30, 1957 |

UNITED STATES PATENT OFFICE
CERTIFICATE OF CORRECTION

Patent No. 3,110,548                  November 12, 1963

Osamu Fukushima et al.

It is hereby certified that error appears in the above numbered patent requiring correction and that the said Letters Patent should read as corrected below.

Column 1, line 50, strike out "by"; column 2, line 50, after "compared" insert -- with --; column 8, line 27, for "setted" read -- set --.

Signed and sealed this 23rd day of June 1964.

(SEAL)
Attest:

ERNEST W. SWIDER                  EDWARD J. BRENNER
Attesting Officer                    Commissioner of Patents